US007062615B2

(12) United States Patent
Miller et al.

(10) Patent No.: US 7,062,615 B2
(45) Date of Patent: Jun. 13, 2006

(54) MULTI-CHANNEL MEMORY ACCESS ARBITRATION METHOD AND SYSTEM

(75) Inventors: Eddie Miller, Costa Mesa, CA (US); David James Duckman, Costa Mesa, CA (US); Jim Donald Butler, Costa Mesa, CA (US); Khanh Hue Huynh, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 249 days.

(21) Appl. No.: 10/651,890

(22) Filed: Aug. 29, 2003

(65) Prior Publication Data

US 2005/0050283 A1    Mar. 3, 2005

(51) Int. Cl.
*G06F 12/00* (2006.01)
(52) U.S. Cl. .................. 711/152; 711/147; 711/163; 710/36; 710/200
(58) Field of Classification Search ............... 711/147, 711/150, 152, 163; 710/36
See application file for complete search history.

(56) References Cited

U.S. PATENT DOCUMENTS 4,984,153 A * 1/1991 Kregness et al. .......... 711/152
6,141,720 A * 10/2000 Jeffords et al. ............ 710/200
6,782,440 B1 * 8/2004 Miller ....................... 710/200

OTHER PUBLICATIONS

Advertisement for "Emulex LP9002C 2 Gb/s Fibre Channel cPCI Host Bus Adapter", Emulex Corporation, Costa Mesa, CA, Doc. No. 02-306, May 2002.
PICMG 2.0 R2.1 (Revision 2.1), Compact PCI™ Specification Short Form, PCT Industrial Computers Manufacturers Group, Wakefield, MA, Sep. 2, 1997 (Copyright 1995, 1996, 1997), pp. 1-7.
Emulex Corporation Product Reference Guide, Emulex Corporation, Costa Mesa, CA, 16 pages.
Advertisement/report for "Emulex HBAs, Industry Leading Fibre Channel Host Bus Adapters", Emulex Corporation, Costa Mesa, CA, Document No. 03-001, Jun. 2002 and Document Nos. 02-321 and 02-319, May 2002.
Emulex Technology Brief for "Sharing Storage Devices in a SAN", Emulex Corporation, Costa Mesa, CA, Document No. 02-316, May 2002, 4 pages.
Advertisement for "LSI7202CP Fibre Channel Host Adapter", LSI Logic Corporation,, Milpitas, CA, Order No. S20091, 10/01-1M, Copyright 2001, 2 pages.

* cited by examiner

*Primary Examiner*—Jack A. Lane
(74) *Attorney, Agent, or Firm*—Morrison & Foerster

(57) ABSTRACT

A method and system for allowing flexible control of access to a shared memory by multiple requesters. In a preferred embodiment, the invention arbitrates access to flash memory on a HBA between multiple host channels and HBA microprocessors, and eliminates contention possibilities for the flash during write cycles by the allowing a grant to be locked for a period defined by the flash write protocol and timing.

32 Claims, 7 Drawing Sheets

MULTI-CHANNEL MEMORY ACCESS ARBITRATION METHOD AND SYSTEM

BACKGROUND OF THE INVENTION

1. Field of the Invention

The present invention relates to a method and system for accessing a memory device and, more particularly, to a method and system for access arbitration between multiple channels and/or devices desiring access to the memory device.

2. Description of the Related Art

Host bus adapters (HBAs) are well-known peripheral devices that handle data input/output (I/O) operations for host devices and systems (e.g., servers). In simple terms, a HBA provides I/O processing and physical connectivity between a host device and external data storage devices. The storage may be connected using a variety of known "direct attached" or storage networking technologies, including Fibre channel, iSCSI, VI/IP, FICON, or SCSI. HBAs provide critical server CPU off-load, freeing servers to perform application processing. HBAs also provide a critical link between storage area networks (SANs) and the operating system and application software residing within the server. In this role the HBA enables a range of high-availability and storage management capabilities, including load balancing, SAN administration, and storage management.

In recent years, the need for host CPU I/O off-load has become increasingly important because of the wide adoption of storage area networking (sharing storage among multiple hosts within a network), requiring complex and intensive I/O operations, and the emergence of processing intensive I/O protocols such as iSCSI. Historically, I/O data rates increased at approximately the rate of Moore's law, which allowed servers to maintain I/O processing performance from one product generation to the next. Networking technologies, however, have increased data rates in ten-fold increments. The adoption of storage networking has driven increase in storage I/O data rates closer to those of traditional networking technologies, with increases of 4 to 10 times. This trend shows no signs of slowing down as iSCSI and Fibre Channel technologies prepare to support 10 Gb/s data rates, and higher, in the future.

The accelerating I/O data rates is creating an "I/O processing gap" in which the computing power needed to fill a fast "data pipe" is growing faster than the CPU power available in the server. Without sufficient processing power, a high speed storage network is under-utilized. Therefore, an HBA is needed to fill the I/O processing gap and provide the performance and efficiency that storage networking can deliver. Additionally, because HBAs offload the server's CPU from managing I/O operations, valuable CPU cycles are returned to the server for application processing, which an end user is primarily concerned with.

FIG. 1 illustrates a block diagram of a host system 10, which includes a conventional host server 12 that executes application programs 14 in accordance with an operating system program 16. The server 12 also includes necessary driver software 18 for communicating with peripheral devices. The server 12 further includes conventional hardware components 20 such as a CPU (not shown), host memory, e.g., ROM or hard disk drive, (not shown), RAM (not shown), cache (not shown), etc., which are well known in the art.

The server 12 communicates via a peripheral component interconnect (PCI or PCIX) bus interface 22 to a HBA 24, which handles the I/O operations for transmitting and receiving data to and from remote fibre channel disk storage devices 28 via a fibre channel fabric 26. Other host systems 30 may also be "connected" to the fibre channel fabric 26 via respective HBAs 32 in a similar fashion. The server 12 may communicate with other devices 36 and/or clients or users (not shown) via an Ethernet port/interface 38, for example, which can communicate data and information in accordance with well-known Ethernet protocols. Various types of communication ports, interfaces and protocols are also known in the art that may be utilized by the server 12. The server 12 may also be connected to the Internet 40 via communication port/interface 38 so that remote computers can communicate with the server 12 using well-known TCP/IP protocols. Additionally, the server 12 may be connected to local area networks (LANs) (not shown) and/or wide area networks (WANs) (not shown) in accordance with known computer networking techniques and protocols.

FIG. 2 is a block diagram illustrating some core components of a conventional HBA card 24. The HBA 24 includes a plurality of contact pins or slides 25 for making electrical contact to corresponding pins or slides in a PCI or PCIX bus slot (not shown) located on the PCI(x) bus interface 22 (FIG. 1), thereby allowing the server 12 (FIG. 1) to communicate with the HBA 24. The HBA 24 further includes a controller circuit 50 that includes a microprocessor 52 for executing program instructions and processing data stored in volatile memory 54. The HBA card 24 also includes a fibre channel connector/port 54 for establishing a communication link to the fibre channel fabric 26.

In conventional systems, typically, the microprocessor 52 is responsible for operations such as direct memory accesses between the host memory and the HBA. The HBA controls data transfers to and from system memory (e.g., FC Disk 28) without the need for host CPU involvement. Additionally, the microprocessor 52 is responsible for handling other I/O data management and processing operations such as processing context information for each frame of data, routing data to appropriate storage devices 28, etc. These types of functions by the microprocessor 52 and HBA 24 are well-known in the art.

The executable program and data (collectively referred to herein as the "program image") necessary for the microprocessor 52 to perform its various I/O management and handling operations is stored in a nonvolatile memory 56 (e.g., flash memory 56). This program image, or at least portions thereof, and data stored in the flash 60 are downloaded on an as needed basis, via flash interface device 58 and a flash interface bus 60, to the volatile memory 54 and/or cache (not shown) for faster execution and processing by the microprocessor 52.

During normal operation, in order to access (read or write) the flash memory 56, during a host or HBA wake-up process, for example, the microprocessor 52 writes to and sets dedicated registers 62 (referred to herein as μp registers 62) allocated for this purpose. As explained in further detail below with respect to FIG. 5A, the μp registers 62 typically include a read-address register 62a (FIG. 5A), a read-data register 62b, a read-next-data register 62c, a write-address register 62d, a write-data register 62e, and a control/status register 62f. Techniques for accessing flash memory utilizing these types of registers and conventional control signals are well-known in the art.

FIG. 3 illustrates a block diagram of some of the core components or modules of a program image that are downloaded from flash memory 56 to volatile memory 54. As shown in FIG. 3, the program image includes a kernel program or module 70, which is the core or minimum instruction set for the microprocessor 52 to operate and execute other instructions and functions. Such kernel programs are well-known in the art. A basic input/output system (BIOS) program 72 is also stored within the volatile memory 54 for performing HBA component configuration and initialization operations at system start up or wake up. Such BIOS programs are also well-known in the art. The program image further includes a status and error program 74 for monitoring the status of microprocessor 52 operations and reporting an error signal if an error occurs. Such status and error programs are also well-known in the art. The program image also includes one or more executable programs 76 and data 78 for performing its I/O operations as discussed above. The diagram in FIG. 3 illustrates that different areas of the flash hold different kinds of contents. Generally, there are two types of accesses to flash memory—automatic and programmed. Automatic accesses are carried out because the requesting device needs the information to be functional. In particular, the microprocessor must read instructions from the flash device directly into its instruction-processing pipeline (not copied to any other memory) when it starts processing after reset is cleared. The "kernel" area contains these instructions. This design relies on information contained in the non-volatile memory to provide a wake-up program for the microprocessor. In a multi-channel HBA, the microprocessor in one channel may be reset and restarted independent of the other microprocessor(s).

The "BIOS" area has another type of automatic access. The host system (server) reads from the flash across the PCI/X bus a program that extends its built-in wake-up program. The program is tailored to the HBA to allow the host system to use the HBA I/O facilities to "boot up," that is, to read extensive control programs from a large external data source. Without this non-volatile "Expansion ROM" the HBA is useless to the host system until the entire host system OS becomes active by booting up over a different external access facility. These automatic direct host-to-flash accesses are known in the art as host ROM base address register (BAR), or ROM BAR, accesses.

The second type of access is a programmed access. In contrast to "automatic" access, described above, programmed accesses retrieve data for various uses in accordance with various application programs. Additionally, these programmed accesses can wait (allowing the requesting device to do other things in the interim) on data availability. In one embodiment, register sets having read data valid (RDV) bits, described in further detail below, are implemented to indicate that data as valid and available in accordance with this programmed access protocol.

Regardless of the way reads are carried out, however, any attempt to alter the non-volatile contents of the flash memory requires a series of programmed accesses first to start an operation (erase sector or write word) and then to determine when the operation is complete. Because the flash device changes from a memory device to an operational controller during these operations, any read access by a requester other than the program that initiated the operation would yield incorrect data.

In order to further meet the increasing demands of I/O processing applications, multi-processor architectures have been developed to provide multi-channel and/or parallel processing capability, thereby increasing the processing power and speed of HBAs. In prior multi-processor HBAs, the function of arbitrating which microprocessor 52 had access to flash memory 56 at any given time was performed by hardware within the controller 50. In contrast to a flexible software control, hardware control is typically implemented by a set of logic gates, which are fixed in their behavior. These gates have no register control bits for feedback and control of the behavior of respective circuits and/or data paths. Thus, in prior multi-processor HBAs, each microprocessor 52 generally had sole access to a separate flash memory 56. If the flash memory 56 was accessed by more than one microprocessor 52, hardware within the controller 50 generally was switched to service a single requester. In other words, hardware within controller circuitry 50 was able to support only one requester at a time, requiring an external control to switch it to service a different requester. These fixed hardware control methods did not allow for flexibility or modification of arbitration schemes once they had been implemented in a HBA device. For example, in prior systems, only one processor had access to the flash memory 56 at any given time in accordance with a fixed access scheme (e.g., round robin, first-in-first-out). Additionally, a source (e.g., host device application) desiring access to the flash had to communicate with a respective microprocessor to access respective areas of the flash 56 that were mapped for access to that particular processor, for example, when each processor had a separate dedicated flash device. Therefore, prior art methods did not provide flexibility or maximize efficiency in sharing flash memory 56.

In order to provide further HBA functionality, robustness and flexibility, some HBAs provide direct access to the flash memory 56 to a host device through a communication path that is independent of the one or more microprocessors 52 on the HBA, and separate from automatic host ROM BAR access requests during host system start up, as described above. For example, if the one or more microprocessors 52 are not functioning properly due to a corrupt "program image," it is desirable to allow a host device to directly access the flash 56 and reprogram a new program image for downloading to the volatile memory 52, from where it is executed by a respective microprocessor 52. A method and system for providing programmed direct host-to-peripheral memory access is described in co-pending application Ser. No. 10/651,887, entitled "Direct Memory Access From Host Without Processor Intervention."

Additionally, it is also possible to have multiple parallel direct host-to-flash communication paths for providing direct access to the flash 56 without microprocessor 52 intervention. Thus, there are at least three categories of requesters that may desire access to the flash 56. The first category includes one or more HBA microprocessors. The second category includes automatic host ROM BAR accesses during host system start up, and the third category includes direct host-to-flash programmed accesses to flash. In an HBA having multiple microprocessors 52 and multiple host communication paths or channels desiring access to the flash memory 56, it is necessary to provide a protocol for arbitrating access requests to flash by these multiple requesters.

As mentioned above, prior art arbitration methods based on hardware control do not provide flexibility and the ability to modify and customize arbitration schemes in accordance with an individual system's design and use. Thus, there is a need for a method and system that provides a flexible arbitration scheme capable of handling and arbitrating multiple requests to access shared memory. There is a further need for an arbitration method and system capable of being modified and customized in accordance with a desired protocol or design for individual systems.

BRIEF SUMMARY OF THE INVENTION

The present invention addresses the above and other needs by providing a method and system that allows for software control of peripheral memory access arbitration. In a preferred embodiment, the invention allows for flexible control of access to peripheral memory (e.g., flash 56) by one or more host device channels and one or more processor device channels.

In one embodiment of the invention, a software controlled method of flash arbitration in a multiprocessor system includes the following features: round robin granting algorithm, write lock that allows one requester to lock out other requesters during write operations, grant suspension and retention, and grant and read pending status feedback to the requesters.

In a further embodiment, the invention provides flexible access of flash memory through one or more host and/or processor interfaces and eliminates contention possibilities for the flash during write cycles by allowing an access grant to a single requestor to be locked for a desired period of time, number of cycles, or until a specified event occurs. Since, typically, flash operation requires multiple bus cycles to complete a single write operation, the write lock function of the present invention prevents interruptions by another requestor that may otherwise result in an incomplete write operation and, hence, unpredictable flash behavior.

In another embodiment of the invention, the method and system of arbitration functions as follows. During normal operation, a flash arbiter circuit, located within the flash controller, grants access to the flash memory based on a round robin algorithm on a cycle by cycle basis. A requester is required to set a write lock bit in a corresponding control/status register in order to hold the grant for more than one bus cycle. This is typically performed for accesses of the flash that require more than one processor or PCI(X) bus cycle (e.g, a flash write operation). Thus, in a multiprocessor system where the flash memory acts as a shared resource, the invention allows each requester (e.g., processor or host channel) to be given the ability to lock the grant in order to control the flash properly.

In a further embodiment, the arbiter will grant access to the requester for which a write lock bit is set in the control/status register when that requesters' turn in the round robin access comes around. Once a requester gets the lock, it keeps the grant until either it suspends itself or it deactivates the write lock. A requester typically will suspend when it sees there is a read pending status bit set in a corresponding control/status register. For normal reads of the flash a grant is active for only one bus cycle. If a requester suspends, it keeps its grant until the current cycle ends and releases it to the requester next in the round robin sequence. This requester holds the grant for a cycle and releases it to the next requester in the round robin sequence, etc., until the suspended requester deactivates or resets its suspend bit. After a current bus cycle ends, the grant returns to the previously suspended requester.

DETAILED DESCRIPTION OF THE PREFERRED EMBODIMENTS

The invention is described in detail below with reference to the figures, wherein like elements are referenced with like numerals throughout. As discussed below, the invention is described in the context of a host server directly accessing nonvolatile flash memory on a HBA via a PCI/PCIX interface. However, it is understood that the invention is not limited to the embodiments described herein and that the principles of the invention may be utilized in other contexts, which utilize different types of host devices, different peripheral devices, different memory devices, different bus/interface architectures, and different protocols, so long as it is desirable for a host device to directly access peripheral memory located on a peripheral device.

Figure 1:
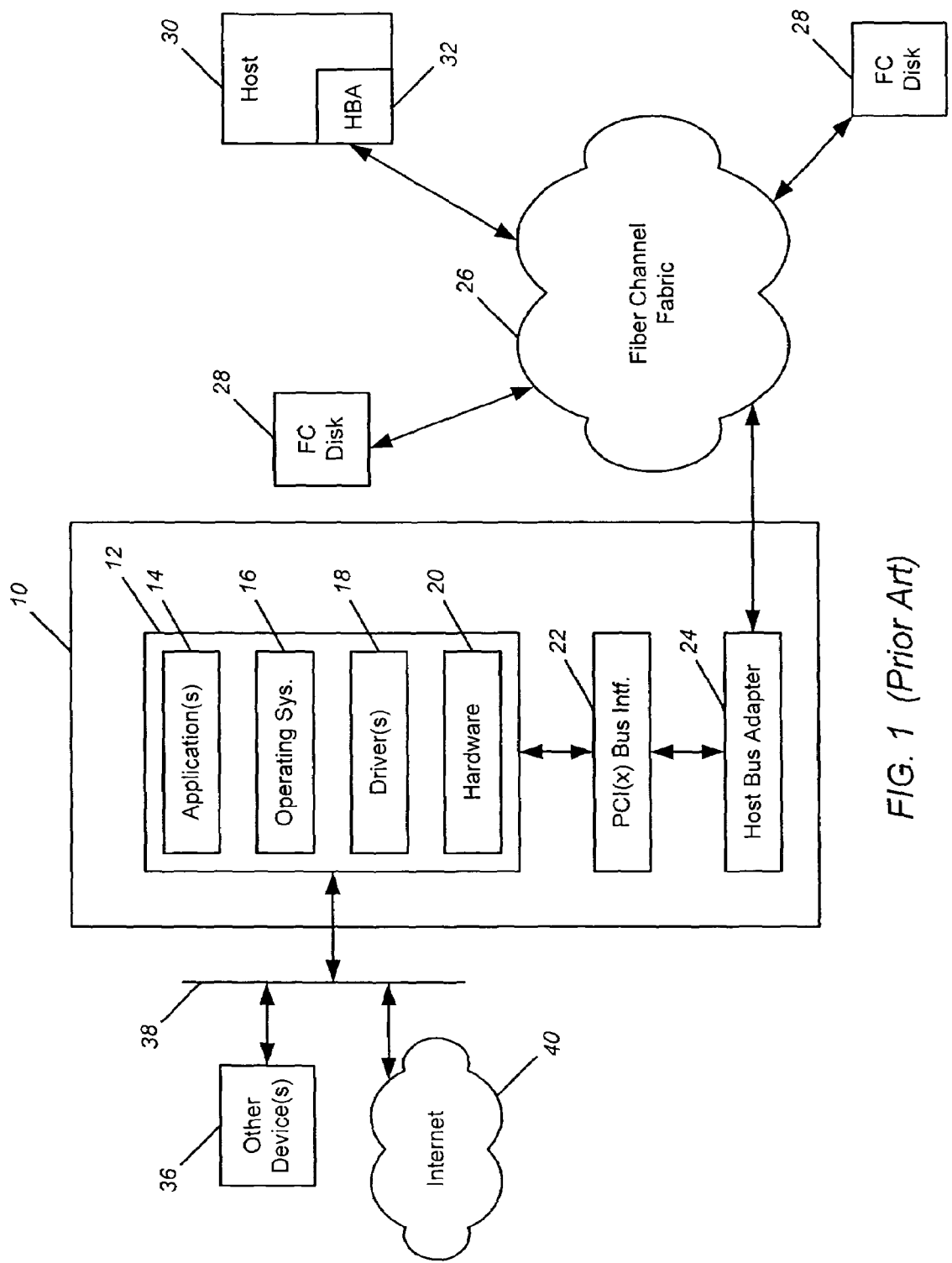
FIG. 1 illustrates a block diagram of prior art host system wherein a host server communicates with a HBA via PCI/PCIX bus interface.
Figure 2:
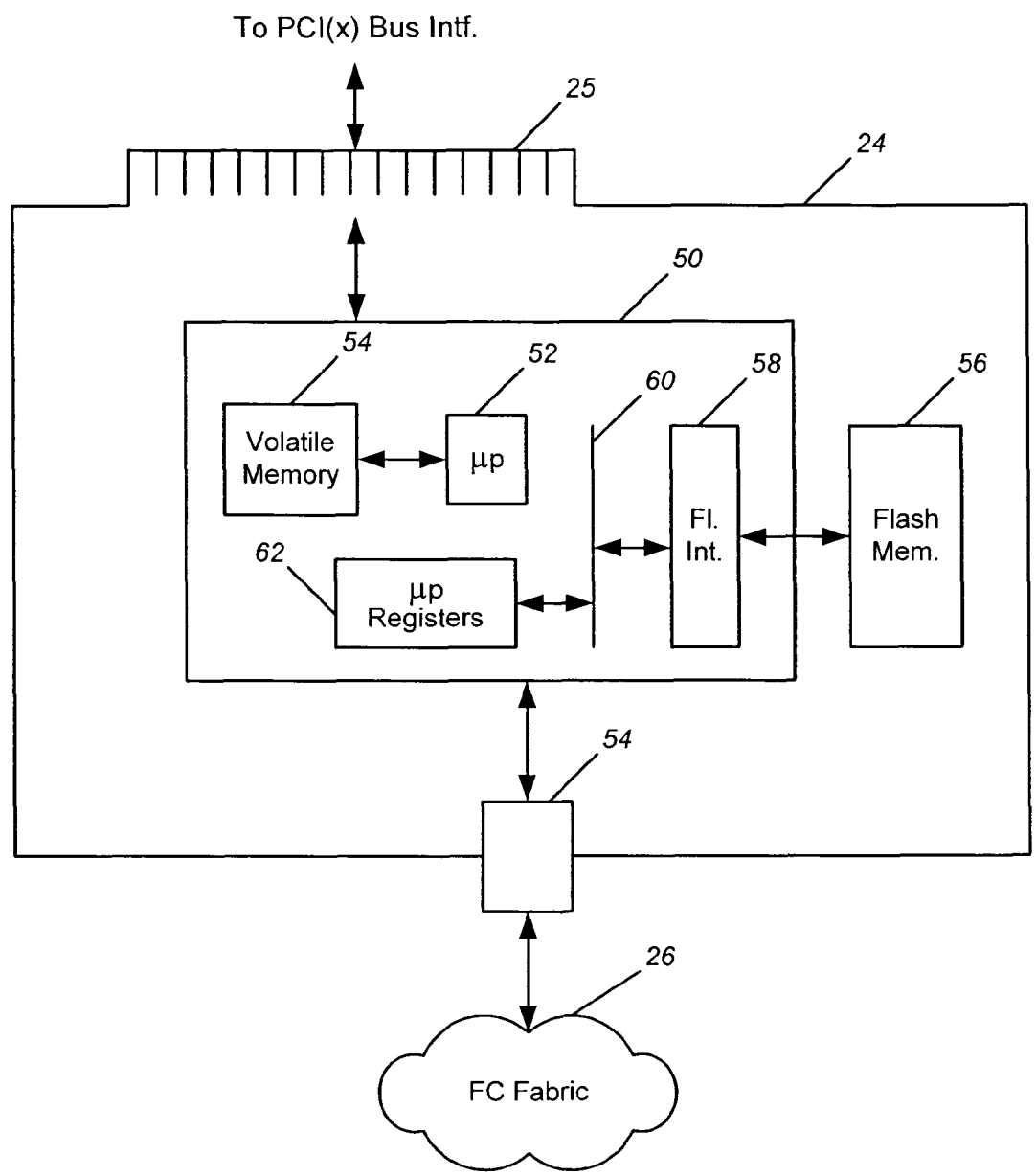
FIG. 2 illustrates a block diagram of a prior art HBA card.
Figure 4:
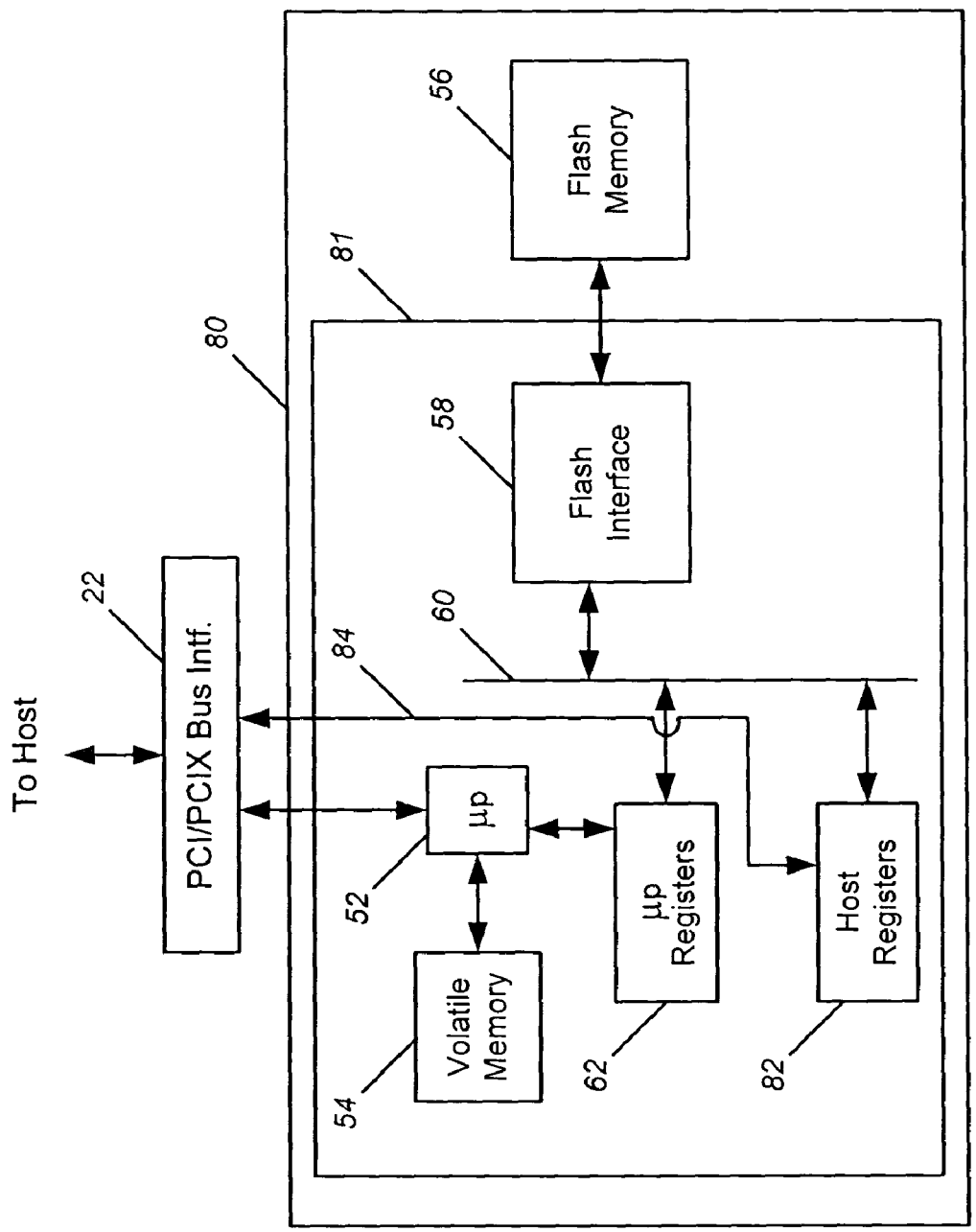
FIG. 4 illustrates a block diagram of an improved HBA card, in accordance with one embodiment of the invention.

FIG. 4 illustrates a block diagram of an improved HBA card 80, in accordance with one embodiment of the present invention. As discussed above, the primary function of an HBA 80 is to provide I/O management and operation offload to the host CPU so that the host server can be utilized for application data processing, rather than handling I/O operations. The HBA 80 is coupled to the host device via a PCI/PCIX bus interface 22, which is a well-known interface and protocol. The HBA 80 contains a flash controller 81, which includes a microprocessor 52 that executes programs/instructions and processes data (collectively referred to herein as a "program image") stored in a volatile memory 54 to perform its various functions. In one embodiment, the microprocessor 52 is a reduced instruction set computer (RISC) microprocessor that is responsible for all direct memory acesses (DMA) between the host memory and the HBA. The HBA controls these transfers to and from host memory without the need for the host CPU to be involved. In a further embodiment, the volatile memory 54 includes cache memory for storing "context information" (e.g., frame no., source, destination, etc.) for up to 2047 concurrent I/O operations. This cache memory can greatly improve the performance of the HBA 80. For example, if frames of data arriving from numerous storage devices 28 (FIG. 1) are interleaved, the HBA needs to have context information about the incoming data, such as frame information in order to process it. The cache memory stores the I/O context information needed for all pending I/Os, thereby making data retrieval for each frame of data very fast and transparent to the server CPU.

The HBA 80 further includes a flash memory 56 for storing the program image that is downloaded to the volatile memory 54 during HBA power up or wake up. Various types of flash memory devices, such as NAND and NOR flash memory devices are well-known in the art. The microprocessor 52 can further access the flash memory 56 on an "as needed" basis during operation of the HBA 80. Since the flash memory 56 is a nonvolatile memory, its contents will not be lost if power to the HBA 80 is lost or turned off. Data is transferred between the volatile memory 54 and the flash memory 56 via the flash interface 58 and the flash interface bus 60. Generally, the operation and functionality of the flash interface circuit 58 and bus 60 are well known in the art. However, an improved flash interface circuit 58, in accordance with one embodiment of the invention, is discussed in greater detail below with reference to FIG. 6.

During HBA 80 wake-up or power-up, or whenever the microprocessor 52 desires to access the flash memory 56, information is retrieved from or written to the flash memory device 56 as follows. The microprocessor 52 writes to a μp register set 62 which activates appropriate circuitry within the flash interface 58 to retrieve the requested data or write data to a specified address location in the flash memory 56. In one embodiment, the μp register set 62 comprises a read-address register, a read-data register, a read-next-data register, a write-address register, a write-data register and a control/status register. In a further embodiment, each of the registers in the μp register set 62 comprises a plurality D-flip flops. The functionality of these registers is described in further detail below with respect to FIG. 5A.

HBA 80 further allows the host device 12 (FIG. 1) to directly access (read and/or write to) the flash memory 56 via the PCI/PCIX interface 22 and the flash interface 58. This direct host-to-flash access capability is implemented by additional host registers 82, which are implemented within the controller 81 of the HBA 80. The host registers 82 are used by the host device 12 to directly access the flash memory 56, without intervention or assistance by the microprocessor 52. During host system 10 (FIG. 1) start-up and initialization, host software, executed by the host device 12, maps the host registers (data, address, etc.) to host configuration space, which allows host software to read and write to the host registers 82 via the PCI/PCIX interface 22 and a direct signal/data path 84.

In order to directly access the flash 56, host software writes to the host register set 82 which activates appropriate hardware/circuitry within the controller 81 to retrieve the requested data or write data to a specified address location in the flash memory 56. In one embodiment, the host register set 82 comprises a read-address register, a read-data register, a read-next-data register, a write-address register, a write-data register and a control/status register. In a further embodiment, each of the registers in the host register set 62 comprises a plurality of D-flip flops. The functionality of these registers is described in further detail below with respect to FIG. 5B.

Host software that performs the various operations discussed herein can be easily implemented by those of ordinary skill in the art, without undue experimentation. Different types of nonvolatile memory devices, including different types of flash memory devices, have different algorithms and protocols for erase, read and write operations. Those of ordinary skill in the art can easily design and implement host software and/or a program image executed by a HBA microprocessor to function with these different algorithms and protocols, by utilizing the host register set 82 as described herein, in accordance with the preferred embodiments of the invention.

Figure 5B:
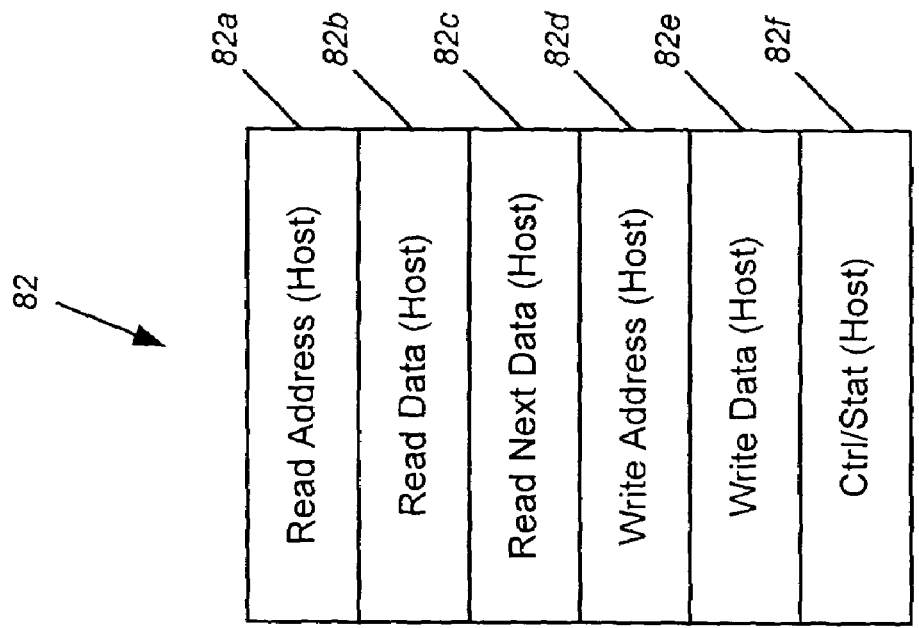
FIG. 5B illustrates a block diagram of a register set that is accessed by host software, in accordance with one embodiment of the invention.
Figure 5A:
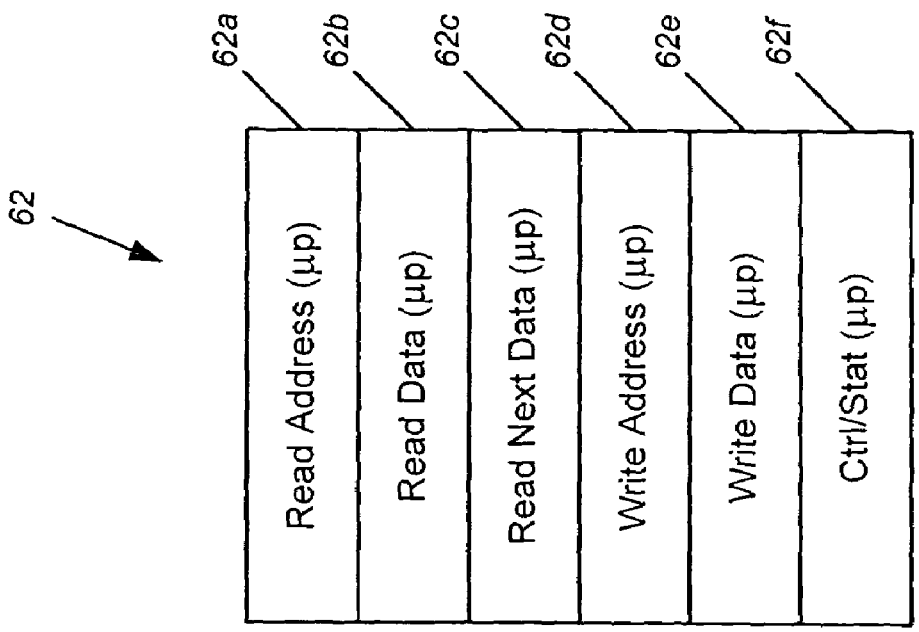
FIG. 5A illustrates a block diagram of a register set that is accessed by the microprocessor on the HBA cards of FIGS. 2 and 4.

FIGS. 5A and 5B illustrate various registers belonging to the μp register set 62 and the host register set 82, respectively, in accordance with one embodiment of the invention. Both register sets 62 and 82 include a read-address register 62a, 82a, a read-data register 62b, 82b, a read-next-data register 62c, 82c, a write-address register 62d, 82d, a write-data register 62e, 82e and a control/status register 62f, 82f. In this embodiment, the host register set 82 is identical with the μp register set 62. However, it is understood that different configurations of the register sets 62 and 82 may be implemented in accordance with the invention. Additionally, in alternative embodiments, control/status registers 62f and 82f can each be implemented as two separate registers—one control register and one status register.

During a direct host-to-flash read operation, in accordance with one embodiment of the invention, host software writes to the host read address register 82a with an address in the flash 56 that contains the desired data to be read. The write of the address to the host read address register 82a causes hardware/circuitry within the controller 81 to retrieve the requested data. Although all of the components of controller 81, such as a state machine, address bus, data bus, for example, are not illustrated in FIG. 4, various types of flash controllers are well known in the art and it is understood by those of ordinary skill in the art that the required controller hardware and/or firmware components are inherently present in controller 81 so as to enable the reading and writing of data to the flash memory 56 as described herein. Additionally, in accordance with an embodiment of the present invention, the controller 81 sets hardware logic values to select a device (e.g., host or HBA microprocessor) for either a read or write cycle and to select an address (and data for a write). The controller 81 then waits an appropriate number of system clock cycles for the flash access operation to be complete, at which time, for a read, for example, it captures the data from the flash memory device 56 and returns it to the requester.

In the embodiment described above, the arbitration scheme arbitrates access to the flash 56 between two set or categories of requesters (i.e., the HBA microprocessors and direct host access requests). In a further embodiment, the arbitration method of present invention can arbitrate between three categories of requesters. It is understood, however, that the arbitration scheme of the present invention can be designed to work when only a single category of requesters are operational or can be extended to any number of categories of requesters.In one embodiment, a first category of requesters includes a HBA microprocessor 52 for each channel, which makes memory access requests over its attached memory bus using an address range pre-assigned for the flash memory device. Its memory access requests are either instruction reads, data reads, or data writes. The microprocessor makes a request as part of the execution of an instruction. The duration of the instruction then depends on the completion of the access over the memory bus.

A second type of requester is the automatic reads implemented by the host system to read data via the PCI/X bus at an address it has previously assigned in a ROM Base Address Register (BAR) (not shown) within a channel of the HBA. The HBA generally signals the host system to retry the access repeatedly until the data is available. The retry mechanism is automatic. The host system may include PCI/X bus hardware that eventually times out an access if the retries are excessive. In general, however, the HBA can provide the requested data from the flash memory device within a short enough time. Such automatic ROM BAR accesses and protocols are known in the art.

In one embodiment, the HBA microprocessor 52 recognizes that a ROM BAR access was requested, reads the data from the flash memory device 56, and writes it to a data register (not shown) so that the HBA can then provide the requested data instead of requiring the host to repeatedly retry obtaining access to the flash. In another embodiment of the arbitration scheme of the present invention, the HBA hardware automatically passes the read request to the flash arbiter 90, accepts the data at the completion of the access, and provides the requested data on the next retry of the ROM BAR access.

A third category of requests includes direct programmed requests from the host system using the host register set 82 to read and/or alter the flash memory 56 contents. These accesses are designed to be operational even if the HBA 80 does not have a proper control program for the microprocessor 52. The access to the registers 82 is over the PCI/X bus 22. Any access is handled immediately by the HBA hardware, not retried, because data availability is a testable status rather than a condition for successful completion of the PCI/X access.

With all the above-described potential requesters independently accessing the flash memory device 56, the HBA 80 must provide an arbitration mechanism, first to hold all requests in abeyance until the current flash access cycle completes and then to select one of the requesters for the next flash access cycle. As long as all requesters are simply reading the contents of the flash memory device 56, it is sufficient to arbitrate on a round-robin basis so that all requesters can make equal progress.

However, if any requester needs to invoke the control functions of the flash memory device 56, it must obtain a series of flash access cycles without interruption by intervening requests. This is necessary for proper operation of the control function (read characteristics, erase sector, write data, etc.). It is also necessary for the sake of the other requesters because they have no way of knowing that they will receive control status rather than memory contents if their read accesses are accepted.

Therefore, the arbitration mechanism of the present invention allows certain requesters to lock out others. Any requester that can carry out control functions must have an associated register in which it can request the lock and receive status when the lock is granted. After granting the lock, the arbitration mechanism holds all access requests in abeyance except those from the lock owner.

While a lock is in place, other requesters do not receive completion notification for any access they make to the flash memory device. In the case of the microprocessor 52, the current instruction execution continues indefinitely until the requested access completes. In the case of the host system reading via a ROM BAR, the PCI/X request is retried until the access completes. In the case of the host system reading via the described register set 82, each access to the read-data register, read-next-data register, or control/status register shows that read data valid (RDV) bit is not set. The controller hardware indicates when the data is valid by setting the RDV bit in one of the registers in the host register set 82 (e.g., the read-data register 82*b*). In a preferred embodiment, the host software continues to read from the host read-data register 82*b* until the RDV bit indicates that the data stored in the register 82*b* is valid and ready for use by the host software.

In a further embodiment, multiple reads to sequential addresses within the flash 56 can be implemented by storing the retrieved data in the read-next-data register 82*c*, as well as the read-data register 82*b*. The host software reads from the read-next-data register 82*c* and when the RDV is set, the data is valid and ready for use by the host software. Data from the next sequential address within the flash 56 is then automatically retrieved as described above. The sequential read process continues storing retrieved data in the read-data register 82*b* and the read-next-data register 82*c* until the last sequential read is performed, wherein the last sequential data is read only from the read-data register 82*b*, indicating the completion of the sequential read operation.

In another aspect of the invention, direct host-to-flash write operations can be performed. First, the host software writes a desired address into a write-address register 82*d*. The host software also writes desired data into the write-data register 82*e*, which causes the controller 81 to execute a write operation to the specified address in the flash 56. As discussed above, flash controllers and associated hardware are well known in the art. The execution of write operations using various control signals (e.g., chip enable, write enable, etc.) and protocols are also well known in the art.

Figure 3:
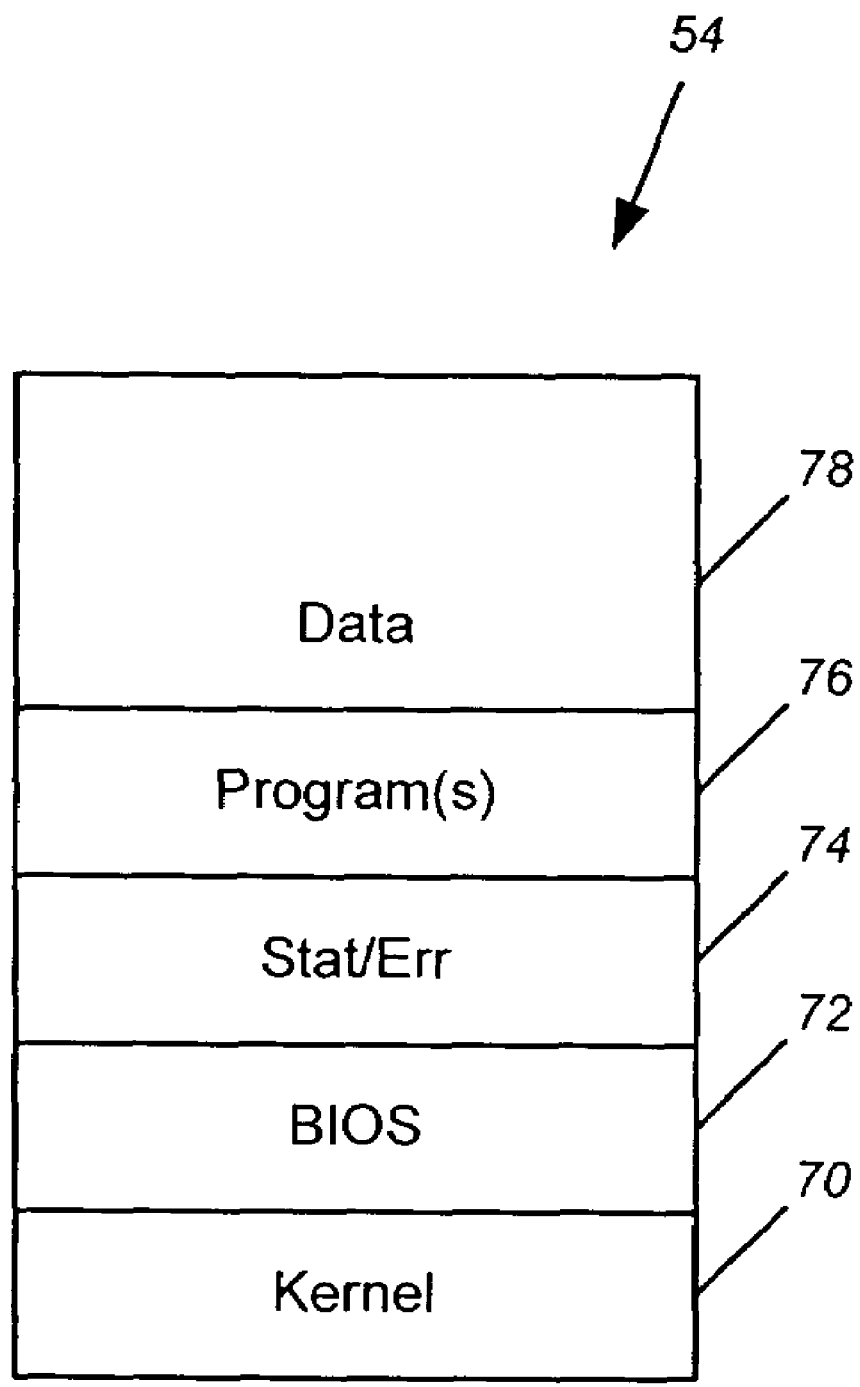
FIG. 3 illustrates a block diagram of typical program modules contained within a program image that is executed by a microprocessor on the HBA card of FIG. 2.

As mentioned above, in one embodiment, the μp registers 62 are identical to the host registers 82. Therefore, the functionality of μp registers 62 is identical to the functionality of the host registers 82, as discussed above, except it is the microprocessor 52 rather than the host 12 that accesses the flash 56. When the microprocessor 52 accesses the flash memory 56, the microprocessor 52 reads and writes to the μp registers 62 in accordance with a software program 76 (FIG. 3) stored in the volatile memory 54 and executed by the microprocessor 52.

In the present invention, when the microprocessor 52 is not functioning properly due to a corrupt program image, the host device 12 can directly access the flash memory, as discussed above. However, when the microprocessor 52 is functioning properly, it is possible to allow the microprocessor 52 to request access to the flash 56 concurrently with host 12 requests to directly access the flash 56. In this way, the flash 56 can accommodate multiple parallel requests from different requesters, thereby enhancing system 10 performance and throughput. However, in order to process these multiple requests, the hardware within controller 81 needs to know which device is requesting access to the flash memory 56—the microcontroller 52 or the host 12—at any given time. The controller 81 also needs to arbitrate these multiple requests (e.g., decide which requester should be given access and for how long).

Figure 6:
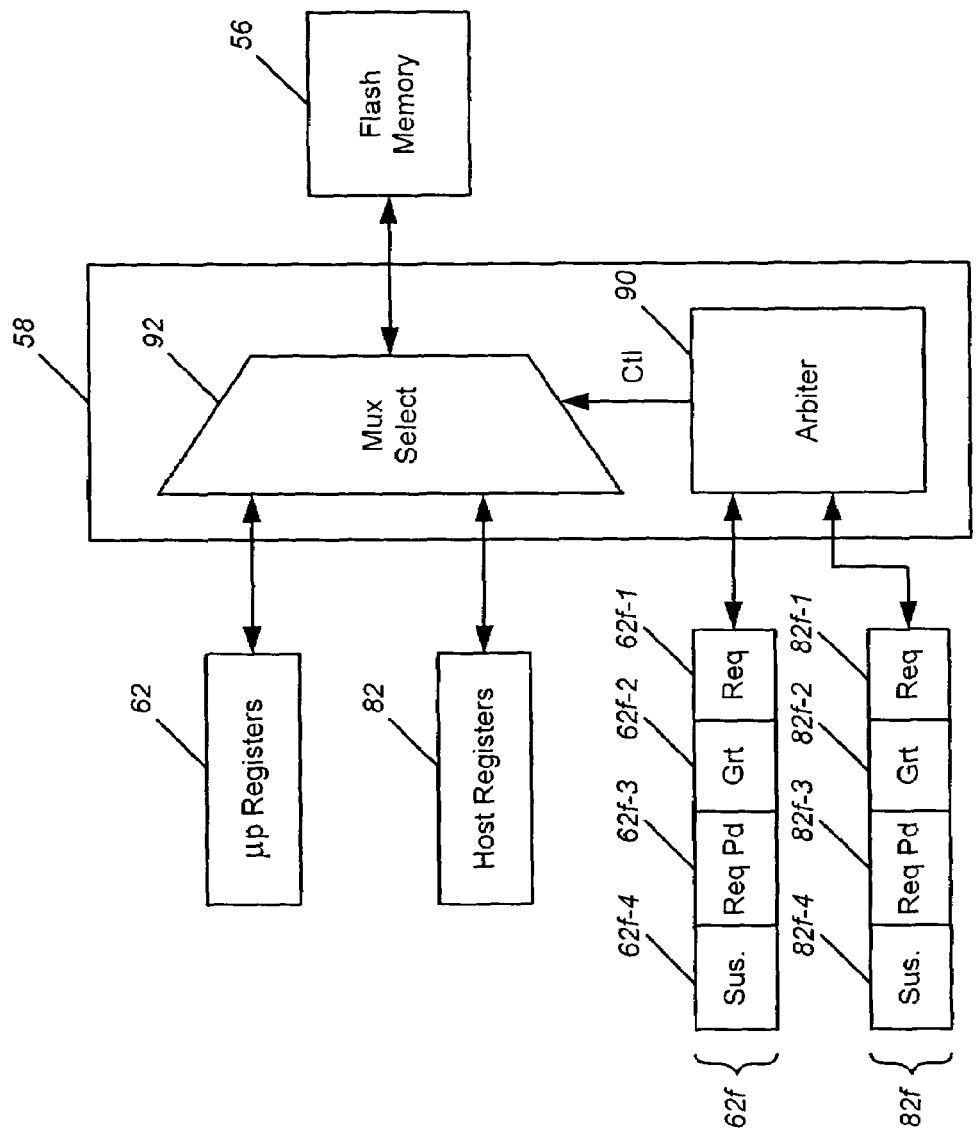
FIG. 6 illustrates a block diagram of a flash interface circuit coupled to the register sets of FIGS. 5A and 5B, in accordance with one embodiment of the invention.

FIG. 6 illustrates a block diagram of a flash interface 58 having an arbiter circuit 90 and a select multiplexer 92, which are coupled to the μp registers 62 and host registers 82 for performing arbitration between flash 56 access requests from the microprocessor 52 and host 12, in accordance with one embodiment of the invention. Note that other components, devices and/or circuits in the flash interface 56 are not shown in FIG. 6. As discussed above, however, those of ordinary skill in the art understand that such other components, devices and/or circuits (e.g., a state machine), which are well known in the art, are inherently present in the flash interface 58 in order to perform the read and write operations to flash 56 as discussed herein. Various types of flash interface circuits 58 are known in the art and could be modified to include the arbiter 90 and multiplexer 92 by those of ordinary skill in the art, without undue experimentation, in order to perform the novel arbitration functions disclosed herein. In a preferred embodiment, the arbiter 90 comprises a state machine. However, the arbiter 90 can be implemented utilizing various technologies known in the art, such as programmable logic arrays, application specific integrated circuits (ASICs), etc.

As shown in FIG. 6, the arbiter 90 is coupled to the control/status registers 62*f* and 82*f*, which control access to the flash 56 by the microprocessor 52 and host device 12, respectively. When either the microprocessor 52 or host device 12 desires access, appropriate software executed by the microprocessor 52 or host device 12, respectively, will set a request bit (Req) 62*f*-1 or 82*f*-1, respectively, in the control/status register 62*f* or 82*f*. The arbiter 90 senses that a request bit, 62*f*-1 or 82*f*-2, has been set, and in response grants access to the requester by setting a corresponding grant bit (Grn) 62*f*-2 or 82*f*-2 in the control/status register 62 or 82. Upon setting the grant bit 62*f*-2 or 82*f*-2 in a particular control/status register, 62*f* or 82*f*, the arbiter 90 sends an appropriate control signal (CTL) to the select multiplexer 92. In response to the control signal received from the arbiter 90, the multiplexer 92 provides a communication path to either the µp registers 62 or the host registers 82 so as to provide access to the flash 56 by either the microprocessor 52 or host device 12, respectively, as discussed above.

Once either the microprocessor 52 or host device 12 is granted access to the flash 56, how the arbitration scheme handles subsequent requests by other requesters, can depend on the software being executed by either the microprocessor 52 or host device 12. In other words, because the arbitration scheme is controlled by software, the invention provides flexibility and convenience to implement various desired arbitration schemes in accordance with system requirements and/or user's preferences. For example, if the host software has been granted access to perform a write operation into the flash 56, the grant bit 82*f*-2 in host control/status register 82*f* is set. In a preferred embodiment, while the grant bit 82*f*-2 is set, access to the flash 56 is locked and no other requesters may be granted access to the flash 56.

Since writing to flash typically requires multiple cycles (e.g., microprocessor cycles or PCI cycles), it is possible that during a write process, another requester may request access to the flash 56. Therefore, while host software is writing to the flash 56, for example, the microprocessor 52 may set its request bit 62*f*-1 to request access to the flash 56. In response to the microprocessor's request, the arbiter then sets a request pending bit (Req Pd) 82*f*-3 in the host control/status register 82*f*, to inform host software that there is another requester that desires access to the flash 56. At this point, if the host write operation is not completed, the host software can be "courteous" and suspend its grant lock by setting a suspend bit (Sus) 82*f*-4 in the host control/status register 82. This then allows the microprocessor 52 to retain access to the flash 56. In order to grant access to the microprocessor 52, arbiter 90 then sets the grant bit 62*f*-2 in the µp control/status register 62. When the host software determines it has been "courteous enough," it will regain its grant lock by deactivating or "resetting" its suspend bit 82*f*-4, at which point access to the flash 56 is regained by host software at the next clock cycle. The decision of when to suspend and when to regain access can be controlled by software and, therefore, different arbitration schemes and "courteousness" levels can be implemented in the host software or software executed by the microprocessor 52 (also referred to herein as "microprocessor software" or "program image"), as programmed by software programmers. For example, the host software can be programmed to regain the host's grant lock after a predetermined time period has elapsed. Alternatively, the host software can suspend the host's grant lock only when there are pending read requests by other requesters, but not pending write requests. In this case, the request pending bit is only set when the pending request by another requester is a read request.

Figure 7:
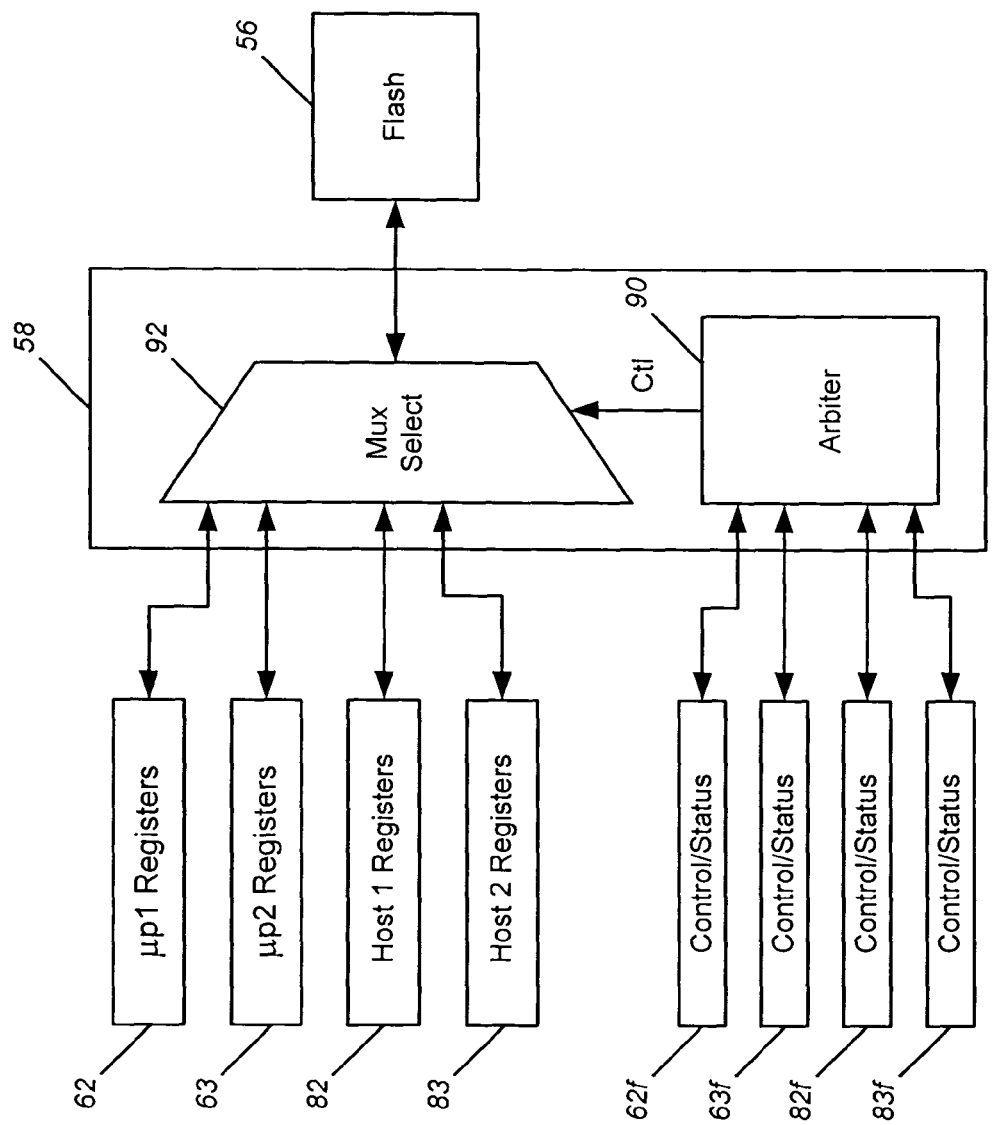
FIG. 7 illustrates a block diagram of a flash interface circuit coupled to register sets for four requesters, in accordance with one embodiment of the invention.

FIG. 7 illustrates the flash interface 58 of FIG. 6 coupled to the register sets of four requesters—two microprocessors and two host PCI/PCIX channels—in accordance with a preferred embodiment of the invention. The register sets include a first microprocessor register set 62, a second microprocessor register set 63, a first host accessible register set 82 and a second host accessible register set 83. In a preferred embodiment, these register sets are identical and include the same types of registers and functionality as discussed above with respect to FIGS. 5A, 5B and 6.

As shown in FIG. 7, the arbiter 90 is coupled to four control/status registers 62*f*, 63*f*, 82*f* and 83*f*, corresponding to register sets 62, 63, 82 and 83, respectively. As discussed above register set 62, including register 62*f*, is accessed by a first microprocessor 52 on a HBA 80 (FIG. 4), when the first microprocessor 52 desires to access the flash. Similarly, register set 82, including control/status register 82*f*, is accessed by host software when the host 12 (FIG. 1) desires to directly access the flash 56, as discussed above. In this embodiment, the HBA 80 also includes a second microprocessor (not shown), which performs operations concurrently and in parallel with the first microprocessor 52 by accessing second microprocessor register set 63 in a similar fashion that the first microprocessor 52 accesses the first microprocessor register set 62. The addition of a second parallel microprocessor in the HBA increases the HBA's I/O processing speed and power. Such multi-processor HBA's are known in the art.

In a further embodiment, in addition to the first PCI/PCIX signal or communication path or channel 84 (FIG. 4), a second path (not shown) is implemented on the HBA 80 to allow the host software executed by the host 12 to access a second set of host registers 83 located on the HBA 80. By providing this second channel, the host software can also perform concurrent and parallel tasks that require direct access to the flash 56. Thus, in one embodiment of the invention, the arbiter 90 must arbitrate between four requesters (first and second microprocessors and two direct host access channels). It is understood, however, that the number of requesters may be more or less than four and the arbitration scheme of the present invention can accommodate any number of two or more requesters.

In one embodiment, when a requester desires access to the flash 56, it will set a request bit in a corresponding control/status register 62*f*, 63*f*, 82*f* or 83*f*. The arbiter 90 will grant access to the requester in accordance with a predefined granting scheme (e.g., round robin or first-in-first-out) by setting a corresponding grant bit in the corresponding control/status register. Thereafter, access to the flash 56 is "locked" to this requester until it has completed its access operation or until the access operation is suspended by software setting a suspend bit in the corresponding control/status register. As discussed above, the conditions in which a current operation are suspended may be flexibly implemented by software executed by the host 12 and corresponding software (e.g., program image) executed by the microprocessors, and stored in flash 56. For example, software can instruct the current requester to suspend its current operation if one or more other requesters request to read data from the flash. Typically, a read operation requires fewer cycles than a write operation and therefore is a relatively quick operation when compared to write operations. Alternatively, the software may cause the current requestor to suspend its current operation only if a designated second requester requests access, while ignoring requests from all other requesters. Alternatively, through software control a current operation can be automatically suspended after a predetermined time period has elapsed, allowing one or more other requesters to access the flash 56, and then automatically "unsuspend" to regain access by the original requester after a second predetermined time period has elapsed. Thus, various priority schemes can be implemented in accordance with the present invention.

In one embodiment, a software controlled method of flash arbitration in a multiprocessor system includes the following features: round robin granting algorithm, write lock that allows one requester to lock out other requesters during write operations, grant suspension and end of suspension reestablishment of grant, and grant and read pending status feedback to the requesters. Thus, when multiple requests are pending, the arbiter 90 handles the requests in accordance with a round robin protocol. Round robin algorithms and protocols are well known in the art. However, the invention allows requestors to "break the rules" of traditional round robin arbitration schemes by allowing the requesters to lock, suspend and reestablish access to the flash 56 in response to predetermined conditions or protocols. Thus, the present invention provides enhanced functionality and flexibility to traditional round robin arbitration schemes. Additionally, in a preferred embodiment, since such enhanced functionality is software controlled, it can easily be modified by downloading and executing new software containing the desired new arbitration functionality.

In a preferred embodiment, the invention provides flexible access of flash memory through one or more host and/or processor interfaces and eliminates contention possibilities for the flash during write cycles by allowing an access grant to a single requestor to be locked for a desired period of time, number of cycles, or until a specified event occurs. Since, typically, flash operation requires multiple bus cycles to complete a single write operation, the write lock function of the present invention prevents interruptions by another requestor that may otherwise result in an incomplete write operation and, hence, unpredictable flash behavior.

In a preferred embodiment of the invention, the method and system of arbitration functions as follows. During normal operation, a flash arbiter circuit located within the flash controller grants access to the flash memory based on a round robin algorithm on a cycle by cycle basis. A requester is required to set a write lock bit in a corresponding control/status register in order to hold the grant for more than one bus cycle. This is typically performed for accesses of the flash that require more than one processor or PCI/PCIX bus cycle (e.g, a flash write operation). Thus, in a multiprocessor system where the flash memory acts as a shared resource, the invention allows each requester (e.g., processor or host channel) to be given the ability to lock the grant in order to control the flash properly.

In a further embodiment, the arbiter will grant access to the requester for which a request lock bit is set in the control/status register when that requesters' turn in the round robin access comes around. Once a requester gets the lock, the requester has sole access to the flash 56 to perform write and/or read operations. The requester keeps the grant until either it suspends itself or it deactivates the lock. In one embodiment, the requester will suspend when it sees there is a read pending status bit set in a corresponding control/status register. For normal reads of the flash, a grant is active for only one flash access cycle. If a requester suspends, it keeps its grant until the current cycle ends and releases it to the requester next in the round robin sequence. This requester holds the grant for a cycle and releases it to the next requester in the round robin sequence, etc., until the suspended requester deactivates/resets its suspend bit. Following resetting of the suspend bit by the suspended requester, and after a current bus cycle ends, the grant returns to the previously suspended requester. Because accesses being held in abeyance are important, the control/status registers 62f, 63f, 82f, and/or 83f include a status bit so that the lock owner knows other accesses are pending. The lock-owning program can take steps periodically to force the flash memory device out of the controller state (i.e., when it is acting as a controller) into the memory-array state (i.e., when it is functioning as a data storage device). The program then sets the "suspend" control bit to remove the lock temporarily and allow the arbitration mechanism to service other requesters. When the program then clears the suspend control bit, the arbitration mechanism again grants exclusive access to the lock owner. The program can then write to the flash memory device to resume the operation or start a new operation.

Another advantageous feature of the present invention is to provide a flexible arbitration program that can prevent other requesters from inadvertently receiving incorrect data while the flash memory device is not in its normal memory-array state, but in its "controller" state. A well-designed utility/application program will obtain a "soft lock" in the system (i.e., hold the system, e.g., microprocessor or host, in order to execute its functions) and then request the hard lock to the flash 56 from the arbitration mechanism. The utility/application program should preferably be able to wait for the granting of the lock while some other application program (in an area that does not share the same soft lock to the system) holds the hard lock to the flash 56. Such a well-designed utility program will also take advantage of the status information provided by the arbitration program to recognize that read requests are being held in abeyance. This allows the application program to suspend a current operation at a convenient time and signal the arbitration program to suspend the lock-out of other requesters temporarily. When its sequence of operations is complete, the well-designed utility/application program will clear its request for the hard lock and give up any soft lock in the system. Utility/application programs such as that described above can be designed and created by those of ordinary skill in the art without undue experimentation.

As described above, the invention provides an improved method and system for allowing flexible control of access to a shared memory by multiple requesters. In a preferred embodiment, the invention arbitrates access to flash memory on a HBA between multiple host channels and HBA microprocessors, and eliminates contention possibilities for the flash during write cycles by allowing a grant to be locked for a period defined by the flash write protocol and timing. This prevents multi-cycle write operations to flash from being interrupted. One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

What is claimed is:

1. A method of arbitrating access to a resource shared by multiple requesters, comprising:
   receiving a request to access the shared resource from a first requester;
   granting and locking access to the shared resource to the first requester such that no other requesters may be granted access to the shared resource;

suspending access to the shared resource by the first requester when a first predefined condition is detected; and reestablishing access to the shared resource by the first requester when a second predefined condition is detected.

2. The method of claim 1 wherein said act of granting and locking is performed in accordance with a round robin arbitration scheme.

3. The method of claim 1 wherein said shared resource is a nonvolatile memory, said first predefined condition comprises a pending request by a second requester to read data from the nonvolatile memory, and said second predefined condition comprises completion of a read operation by the second requester.

4. The method of claim 1 wherein:
said act of receiving a request comprises setting a request bit in a control/status register corresponding to said first requester;
said act of granting and locking comprises setting a grant bit in the control/status register;
said act of suspending comprises setting a suspend bit in the control/status register; and
said act of reestablishing access comprises resetting the suspend bit in the control/status register.

5. The method of claim 1 wherein said first predefined condition comprises setting a request pending bit in said control/status register and said second predefined condition comprises resetting the request pending bit.

6. The method of claim 1 wherein said share resource is a nonvolatile flash memory on a HBA card, said first requester comprises a host device, coupled to the HBA card, said second requester comprises a microprocessor on the HBA card, and wherein:
said act of receiving a request comprises setting a request bit in a control/status register located on the HBA card and corresponding to the host device;
said act of granting and locking access comprises setting a grant bit in the control/status register;
said act of suspending comprises setting a suspend bit in the control/status register; and
said act of reestablishing access comprises resetting the suspend bit.

7. The method of claim 1 wherein said share resource is a nonvolatile flash memory on a HBA card, said first requester comprises a first microprocessor on the HBA card, said second requester comprises a second microprocessor on the HBA card, and wherein:
said act of receiving a request comprises setting a request bit in a control/status register located on the HBA card and corresponding to the first microprocessor;
said act of granting and locking access comprises setting a grant bit in the control/status register;
said act of suspending comprises setting a suspend bit in the control/status register; and
said act of reestablishing access comprises resetting the suspend bit.

8. The method of claim 1 wherein said share resource is a nonvolatile flash memory on a HBA card, said first requester comprises a first host direct access channel, said second requester comprises a second host direct access channel, and wherein:
said act of receiving a request comprises setting a request bit in a control/status register located on the HBA card and corresponding to the first host direct access channel;
said act of granting and locking access comprises setting a grant bit in the control/status register;
said act of suspending comprises setting a suspend bit in the control/status register; and
said act of reestablishing access comprises resetting the suspend bit.

9. The method of claim 1 wherein said first and second predefined conditions are modifiable by changing software executed by the first requester.

10. The system of claim 1 wherein said shared resource is a nonvolatile flash memory on a HBA card, said first requester comprises a first host direct access channel, said second requester comprises a second host direct access channel, and wherein:
said means for receiving a request comprises means for setting a request bit in a control/status register located on the HBA card and corresponding to the first host direct access channel;
said means for granting and locking access comprises means for setting a grant bit in the control/status register;
said means for suspending comprises means for setting a suspend bit in the control/status register; and
said means for reestablishing access comprises means for resetting the suspend bit.

11. The system of claim 1 wherein said first and second predefined conditions are modifiable by changing software executed by the first requester.

12. A method of arbitrating access to a shared memory between multiple requesters, comprising:
granting access to a first requester desiring to write data into the shared memory when the first requesters' turn in a round robin sequence comes due;
locking access to the first requester until the first requester either suspends itself or completes its write operation, wherein the first requester suspends itself when there is a pending request to read from shared memory by a second requester; and
wherein if the first requester suspends itself, it keeps access until a current cycle ends and thereafter releases access to the second requester, which holds access for a single cycle and thereafter releases its access to either a next requester in the round robin sequence or the first requester if the first requester deactivates its suspension and reestablishes its access grant.

13. The method of claim 12 wherein said act of locking access comprises detecting whether a lock-write bit in a control/status register corresponding to said first requester has been set and, if so, locking out other requesters until the first requester suspends itself or resets the lock-write bit, and wherein said first requester suspends itself by setting a suspend bit in the control/status register and deactivates its suspension be resetting the suspend bit.

14. An apparatus for arbitrating access to a shared resource between multiple requesters, comprising:
a first set of registers accessible by a first requestor for providing access to the shared resource by the first requestor;
a second set of registers accessible by a second requester for providing access to the shared resource by the second requester; and
a control circuit, coupled to the first and second set of registers, for arbitrating access to the shared resource between the first and second requesters.

15. The apparatus of claim 14 wherein said first and second set of registers each comprise a control/status register, the control/status register comprising a request bit, a grant bit, a request pending bit and a suspend bit, wherein said request bit is set by a requester desiring access to the shared resource and thereafter detected by the control circuit, said grant bit is set by the control circuit to grant access to the shared resource; said request pending bit is set by the control circuit when another requester is requesting access to the shared resource, and said suspend bit is set by a requester with current access to relinquish access to another requester desiring access to the shared resource, and reset to reestablish access to the shared resource.

16. The apparatus of claim 15 wherein software executed by the requesters determine when to set and reset said suspend bit in a respective control/status register.

17. The apparatus of claim 14 wherein said apparatus comprises a host bus adapter card, said shared resource is a nonvolatile memory on the host bus adapter card, said first requester is a microprocessor located on the host bus adapter card and said second requester is a host device coupled to the host bus adapter card via a PCI/PCIX bus interface.

18. The apparatus of claim 14 wherein said apparatus comprises a host bus adapter card, said shared resource is a nonvolatile memory on the host bus adapter card, said first requester is a first microprocessor located on the host bus adapter card and said second requester is a second microprocessor located on the host bus adapter card.

19. The apparatus of claim 14 wherein said apparatus comprises a host bus adapter card, said shared resource is a nonvolatile memory on the host bus adapter card, said first requester is a first host direct access channel and said second requester is a second host direct access channel, wherein said first and second host direct access channels provide two parallel access channels between a host device coupled to the host bus adapter card via a PCI/PCIX bus interface and the nonvolatile memory.

20. The apparatus of claim 14 wherein said apparatus comprises a host bus adapter card, said shared resource is a nonvolatile flash memory on the host bus adapter card, said first requester is a microprocessor located on the host bus adapter card and said second requester is a host device coupled to the host bus adapter card via a PCI/PCIX bus interface and wherein said control circuit comprises a flash interface circuit that further comprises a arbiter circuit, coupled to said first and second sets of registers and a multiplexer, coupled to said arbiter circuit and said first and second sets of registers, for selectively providing access to either the first requester or the second requester, based on a control signal received from the arbiter circuit.

21. The apparatus of claim 20 wherein said first and second sets of registers each comprise an address register, a data register, and a control/status register, the control/status register comprising a request bit, a grant bit, a request pending bit and a suspend bit, wherein said request bit is set by a requester desiring access to the shared resource and thereafter detected by the control circuit, said grant bit is set by the control circuit to grant access to the shared resource; said request pending bit is set by the control circuit when another requester is requesting access to the shared resource, and said suspend bit is set by a requester with current access to relinquish access to another requester desiring access to the shared resource, and reset to reestablish access to the shared resource.

22. The apparatus of claim 21 wherein said control/status registers each further comprise a write-lock bit and said arbiter circuit grants access to the flash memory to said first requester when the write lock bit is set in the control/status register belonging to the first set of registers, and when the first requesters' turn in a round robin sequence comes due, said first requester retaining access until either it suspends itself by setting said suspend bit or it deactivates the write lock by resetting the write-lock bit.

23. The apparatus of claim 22 wherein said first requester suspends itself when said read pending bit is set in the corresponding control/status register for the first requester, indicating that said second requester desires to read data from said flash memory.

24. The apparatus of claim 23 wherein said first requester will deactivate its suspension by resetting said suspend bit when said second requester has completed its read operation and there are no other requesters with pending read requests ahead of the first requester in said round robin sequence.

25. A system for arbitrating access to a resource shared by multiple requesters, comprising:
   means for receiving a request to access the shared resource from a first requester;
   means for granting and locking access to the shared resource to the first requester such that no other requesters may be granted access to the shared resource;
   means for suspending access to the shared resource by the one requester when a first predefined condition is detected; and
   means for reestablishing access to the shared resource by the one requester when a second predefined condition is detected.

26. The system of claim 25 wherein said shared resource is a nonvolatile memory, said first predefined condition comprises a pending request by a second requester to read data from the nonvolatile memory, and said second predefined condition comprises completion of a read operation by the second requester.

27. The system of claim 25 wherein:
   said means for receiving a request comprises means for setting a request bit in a control/status register corresponding to said first requester;
   said means for granting and locking comprises means for setting a grant bit in the control/status register;
   said means for suspending comprises means for setting a suspend bit in the control/status register; and
   said means for reestablishing access comprises means for resetting the suspend bit in the control/status register.

28. The system of claim 25 wherein said first predefined condition comprises setting a request pending bit in said control/status register and said second predefined condition comprises resetting the request pending bit.

29. The system of claim 25 wherein said shared resource is a nonvolatile flash memory on a HBA card, said first requester comprises a host device, coupled to the HBA card, said second requester comprises a microprocessor on the HBA card, and wherein:
   said means for receiving a request comprises means for setting a request bit in a control/status register located on the HBA card and corresponding to the host device;
   said means for granting and locking access comprises means for setting a grant bit in the control/status register;
   said means for suspending comprises means for setting a suspend bit in the control/status register; and
   said means for reestablishing access comprises means for resetting the suspend bit.

30. The system of claim 25 wherein said shared resource is a nonvolatile flash memory on a HBA card, said first requester comprises a first microprocessor on the HBA card, said second requester comprises a second microprocessor on the HBA card, and wherein:

said means for receiving a request comprises means for setting a request bit in a control/status register located on the HBA card and corresponding to the first microprocessor;

said means for granting and locking access comprises means for setting a grant bit in the control/status register;

said means for suspending comprises means for setting a suspend bit in the control/status register; and said means for reestablishing access comprises means for resetting the suspend bit.

31. A system for arbitrating access to a shared memory between multiple requesters, comprising:

means for granting access to a first requester desiring to write data into the shared memory when the first requesters' turn in a round robin sequence comes due;

means for locking access to the first requester until the first requester either suspends itself or completes its write operation, wherein the first requester suspends itself when there is a pending request to read from shared memory by a second requester; and wherein if the first requester suspends itself, it keeps access until a current cycle ends and thereafter releases access to the second requester, which holds access for a single cycle and thereafter releases its access to either a next requester in the round robin sequence or the first requester if the first requester deactivates its suspension and reestablishes its access grant.

32. The system of claim 31 wherein said means for locking access comprises means for detecting whether a lock-write bit in a control/status register corresponding to said first requester has been set and, if so, locking out other requesters until the first requester suspends itself or resets the lock-write bit, and wherein said first requester suspends itself by setting a suspend bit in the control/status register and deactivates its suspension by resetting the suspend bit.

* * * * *